United States Patent [19]
Belyaev

[11] 3,829,630
[45] Aug. 13, 1974

[54] TROLLEY WIRE SUSPENSION FOR USE IN OVERHEAD CONTACT WIRE SYSTEM OF ELECTRIC TRANSPORT
[76] Inventor: Igor Alexandrovich Belyaev, 10K, 10, korpus 9, kv. 64, Moscow, U.S.S.R.
[22] Filed: Jan. 15, 1973
[21] Appl. No.: 323,403

[52] U.S. Cl.................................... 191/41, 248/61
[51] Int. Cl............................................. B60m 1/22
[58] Field of Search................... 191/22, 33, 40, 41; 104/112, 123, 124; 248/49, 51, 58, 59, 60, 61, 63

[56] References Cited
FOREIGN PATENTS OR APPLICATIONS
70,976   1/1928   Sweden................................. 191/41
1,046,664  12/1958  Germany.............................. 191/41

Primary Examiner—Gerald M. Forlenza
Assistant Examiner—D. W. Keen
Attorney, Agent, or Firm—Holman & Stern

[57] ABSTRACT

The present invention relates to the art of electric transport with power supply from stationary power sources, and particularly to a trolley wire suspension for use in an overhead contact wire system of this particular type of electric transport.

The essence of the invention resides in that rigidly secured to the messenger wire of a trolley wire suspension are links made, in one of the embodiments, in the form of rigid rods, are spaced apart along the length of the messenger wire, the adjacent links in a span being arranged on either side of the vertical plane passing through the messenger wire. Connected to the free end of each link are hangers wherefrom the contact element, conssting of one or more trolley wires, is suspended directly, through a supplementary L-shaped link, or a supplementary wire.

As a result, the messenger wire is twisted, under the weight of the contact element, along its full length between each pair of adjacent links. Therewith, use is made of the elastic properties of the messenger wire, regarded here as a stretched string, as well as of its torsion. Besides, use is also made of its internal friction forces.

The resulting trolley wire suspension features equal elasticity at any point in a span, which is essential for use in modern electric transport characterized by high speeds and power of the electric vehicles. Proper use made of the internal friction forces of the messenger wire contributes to mitigating self-induced vibratios. vibrations.

20 Claims, 12 Drawing Figures

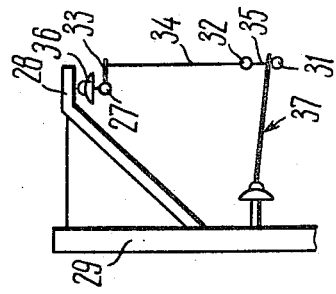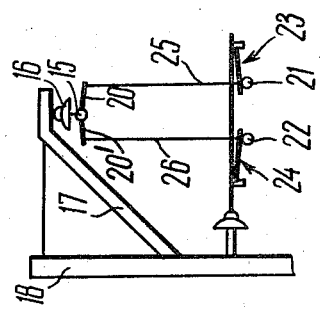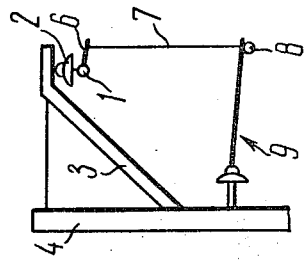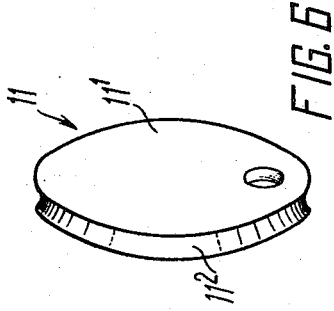

TROLLEY WIRE SUSPENSION FOR USE IN OVERHEAD CONTACT WIRE SYSTEM OF ELECTRIC TRANSPORT

The present invention relates to the art of electric transport, namely the electric transport with power supply from stationary power sources, and more particularly to a trolley wire suspension for use in an overhead contact wire system of this particular type of electric transport.

Known in the art is a trolley wire suspension comprising a messenger wire and a trolley wire suspended upon the messenger wire through the medium of hangers. Each hanger of this trolley wire suspension is directly connected, by one end, to the messenger wire and, by the other end, to the trolley wire. Such simplest trolley wire suspension, however, is suitable for use only under relatively easy service conditions involving low-power electric vehicles and relatively slow speeds thereof. For use in modern electric transport, especially on electrified express tracks, this trolley wire suspension is absolutely impractical.

The development of electric transport, especially the expansion of networks of electrified railroads, involving an increase in power and speed of electric vehicles, as well as the necessity to electrify railroads passing through areas with arduous climatic conditions, have prompted the creation of more reliable and, particularly, more stable to dynamic loads trolley wire suspensions.

In the sixties, a trolley wire suspension was developed having two messenger wires, as well as a trolley wire suspension comprising, in addition to a messenger wire and to a trolley wire, a supplementary wire disposed intermediate of said messenger and trolley wires.

Such a complication of trolley wire suspensions had proved their reliability in operation particularly by improving the main parameter of trolley wire suspensions, viz. coefficient of inconstancy of elasticity (a value which is inversaly proportional to stiffness factor) in a span, which coefficient is equal to the ratio between maximum elasticity (usually at the midpoint of the span) and minimum elasticity (usually at a point in direct proximity to one of the towers).

However, the provision of more complicated and more expensive trolley wire suspensions having two messenger wires or supplementary messenger wires disposed intermediate of the messenger and trolley wires, could not ensure an improved coefficient of inconstancy of elasticity (close to unity), and therefore, the attempts to improve their operational reliability have failed.

Also known in the art is a trolley wire suspension wherein the elasticity along a span has to some extent been leveled off by providing a spring-loaded hanger also known as $\gamma$-hanger. In this case, the coefficient of inconstancy of elasticity could be reduced from an average of 1.9 to 1.67, the length of the horizontal portion of the spring-loaded hanger being 10 m, to 1.21, said length being 14 to 18 m, and to 1.13, said length being 20 m. These data suggest that a substantial reduction of the coefficient of inconstancy of elasticity can be attained by means of spring-loaded hangers provided the length of their horizontal portion is equal to at least on third of the span length. Naturally, such a trolley wire suspension is too expensive and complicated.

The introduction of two (instead of one) spring-loaded hangers in a span has produced but negligible technical effect rendering the suspension system still more complicated and expensive. For example, the length of the horizontal portions of both spring-loaded hangers being 35 and 8 m respectively, the coefficient of inconstancy of elasticity was reduced only by 0.03.

Studies conducted with trolley wire suspensions using the above-mentioned supplementary messenger wire indicate that, being more complicated even than suspensions provided with spring-loaded hangers, they ensure a reduction of the coefficient of inconstancy of elasticity only to 1.21, which obviously cannot neet the requirements of modern electric transport.

The art knows other embodiments of trolley wire suspensions wherein emphasis was placed on the design of hangers, mostly by adding thereto various spring means. In one case, helical springs were added to hangers. Another embodiment consists in providing hangers in the form of straightened, under normal conditions, helical springs.

The desire not only to level off the elasticity of a trolley wire suspension in a span, but also to improve its damping properties, has prompted the development of a trolley wire suspension with a supplementary messenger wire (double trolley system) and spring-air dampers incorporated into hangers. The coefficient of inconstancy of elasticity of these trolley wire suspensions in a span is equal to 1.18.

Among the above-considered trolley wire suspensions with hangers provided with spring means (with spring-loaded hangers), optimum technical characteristics are revealed in the latter suspension. This trolley wire suspension, however, suffers from a disadvantage of being to expensive, difficult in installation and service, and insufficiently reliable because of complicated design.

And, finally, a trolley wire suspension is known having hangers provided with resilient elements (resilient hangers) which resilient elements are solid rods made from a resilient material, being incorporated into the hangers and imparting resilient properties thereto. The coefficient of inconstancy of elasticity of such trolley wire suspensions is 1.33. The latter embodiment, chosen as a prototype for cur invention, should be considered as the most suitable from considerations of operating economy for its simplicity and reduced coefficient of inconstancy of elasticity. The most significant advantage of such trolley wire suspensions over other types of single catenary suspensions (without a supplementary messenger wire) resides in their improved damping properties determined by the internal friction of the material of the resilient rods incorporated into hangers.

As can be seen from the above examples of various embodiments of trolley wire suspensions, none of them can provide for the same elasticity value over a span even when rather complicated elements are introduced thereto, each as supplementary messenger wires combined with spring means and air dampers incorporated into hangers. And when it comes to relatively simple single catenary suspensions, even in the most advanced of them described in the latter example, there is observed an inconstancy of elasticity at different points within a span, which is a serious disadvantage of this particular suspension, limiting its application especially in modern electrified railroads with powerful and high-speed electric vehicles.

It is an object of the present invention, therefore, to obviate this basic disadvantage residing in a marked inconstancy of elasticity at different points within a span of the prior art trolley wire suspensions, and to provide a trolley wire suspension which, being simple in design, will provide for equal elasticity at different points within a span and enhancing the effect of damping forces which is essential for ensuring a more reliable and efficient current collection especially at high speeds characteristic of modern electric vehicles.

The basic object of the invention is to provide a trolley wire suspension wherein equal elasticity at different points in a span and enhanced effect of damping forces will be achieved by using the torsional strength and internal friction forces of a multiple-strand messenger wire.

This object is attained by that a trolley wire suspension for use in an overhead contact wire system of electric transport, comprising, in each span, a messenger wire, a contact element consisting of one or more trolley wires, and a hangers linking the contact element with the messenger wire, has, according to the invention, at least two links each being connected, by one end, to the messenger wire and, by the other end, to a hanger coupled to the contact element, said links being spaced apart along the messenger wire and arranged on either side of the vertical plane passing through the messenger wire, thus enabling the latter to be twisted.

In the embodiment of a trolley wire suspension wherein the contact element consists of two trolley wires arranged in the horizontal plane on either side of the vertical plane running through the messenger wire, according to the invention, it is expedient that the links, secured to the messenger wire and arranged on either side of the vertical plane passing through the messenger wire, be connected to the hangers, coupled to the contact element, so that the hangers coupled to the trolley wire of the contact element disposed on one side of the vertical plane passing through the messenger wire should be connected to the hangers disposed on the same side of said vertical plane.

Each link in the proposed trolley wire suspension for use in an overhead contact wire system of electric transport can be advantageously made in the form of a rigid rod secured, by one end, to the messenger wire and, by the other end, to a respective hanger coupled to the contact element.

Each link in the proposed trolley wire suspension for use in an overhead contact wire system of electric transport can also be made in the form of a rigid cylinder fitted on the messenger wire so that the latter should pass through the base of said cylinder, connected to the side surface whereof is a respective hanger coupled to the contact element.

It is preferable that in the simplest embodiment of the proposed trolley wire suspension for use in an overhead contact wire system of electric transport, wherein there is only one messenger wire and the contact element consists of only one trolley wire, the contact element be linked to the messenger wire through hangers each provided with a supplementary L-shaped link secured rigidly, by one end, to the contact element and connected, by the other end, directly to the lower free end of the hanger, thus preventing the contact element from upsetting.

In the proposed trolley wire suspension for use in an overhead contact wire system of electric transport, comprising a messenger wire and a contact element consisting of one or more trolley wires, the contact element may be linked with the messenger wire along all the hangers through a supplementary wire suspended wherefrom is the contact element and directly connected whereto are the free ends of all the hangers.

It is also possible, in a trolley wire suspension for use in an overhead contact wire system of electric transport, the messenger wire whereof is rigidly secured near one of the towers according to the invention, that the last link secured on the messenger wire just before this tower in the preceding span, and the first link secured on the messenger wire immediately after the same tower in the following span, be arranged on one side of the vertical plane passing through the messenger wire.

The proposed trolley wire suspension in every possible embodiment thereof: with one messenger wire and a contact element consisting of only one trolley wire, with one messenger wire and a contact element consisting of two trolley wires, and with a messenger wire, a supplementary wire, a contact element suspended directly from the latter and consisting of one or more trolley wires, — makes it possible to obtain a coefficient of inconstancy of elasticity in a span equal to unity, i.e. practically equal elasticity at any point with a span. This can be achieved in mounting such a suspension by simplest means, namely by adequately selecting the arms of the links and be properly distributing the links along the messenger wire. The trolley wire suspension of the present invention is simple in design, easy in installation and maintenance under any service conditions, and naturally, inexpensive.

It should also be emphasized that the use of the torsion strength and internal friction forces of the multiple-strand messenger wire, forming the basis of the present invention, allows, besides attaining the object of the invention (ensuring equal elasticity at different points within a span of the suspension), for substantially improving the damping properties of the proposed trolley wire suspension as compared to the prior art suspensions: the logarithmic decrement of the oscillations of the proposed single catenary suspension with only one messenger wire (without a supplementary wire) is almost twice as high as compared to that of the prior art single catenary suspensions without dampers.

This means that the proposed trolley wire suspension is practically unaffected by self-induced vibrations, i.e. low-frequency high-amplitude oscillations. Such oscillations, as applied to electric power lines and overhead contact line systems, are often referred to as "galloping of conductors."

The coefficient of inconstancy of elasticity in a span of the proposed trolley wire suspension being equal to unity, which means that the total elasticity thereof is absolutely the same at any point of the span, and improved damping properties of the novel suspension determine the constancy of dynamic forces between the moving current collector of an electric vehicle and the contact element, hence a constant contact pressure. The invariability (stability) of the contact pressure determines in turn uniform wear of the contact element along the whole span. Such operating conditions of the trolley wire suspension, as may be inferred from the foregoing, substantially increase the life of its contact element as compared to the prior art catenary suspensions described hereinabove. As a matter of fact, in the prior art catenary suspensions, due to unequal elasticity at different points in a span, maximum wear of the contact element is 1.4 times more intensive than its mean wear, so it should be replaced at intervals determined by maximum wear thereof. As long as in the proposed trolley wire suspension maximum wear of its contact element is equal to its mean wear along the whole span, its service life, with copper bars on current collector strips, is 1.3 to 1.4 times as high as that of the prior art suspensions.

The stability of contact pressure is also responsible (all other things being equal) for a marked abatement of radio interference noise, which is rather important taking into consideration the wide spread of broadcasting, television and radiotelephone communication at the present day. The high decrement of oscillations associated with the high internal resistance of the proposed trolley wire suspension ensures a reliable current transfer from the overhead contact line to the electric vehicle current collectors when several of them are lifted at a time, and, as mentioned above, a high stability against self-induced vibrations (galloping), which enables such trolley wire suspensions to be used in areas noted for heavy icing conditions, where conventional catenary suspensions fail to provide for a reliable electric contact.

Given below is a detailed description of the present invention, as applied to electrified railroads, with reference to embodiments thereof taken in conjunction with the accompanying drawings, wherein:

FIG. 3 is a cross section of the trolley wire suspension of FIGS. 1 and 2 through an adjacent tower;

FIG. 6 is an axonometric view of a link for the trolley wire suspension made in the form of a rigid cylinder according to the invention;

FIG. 9 is a cross section of the trolley wire suspension of FIGS. 7 and 8 through an adjacent tower;

FIG. 12 is a cross section of the trolley wire suspension of FIGS. 10 and 11 through an adjacent tower.

Figure 1:
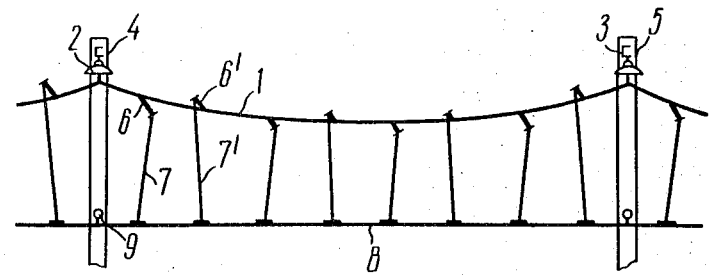
FIG. 1 is a simplified side elevation of a trolley wire suspension with one messenger wire and a contact element consisting of one trolley wire, according to the invention.

Referring now to the drawings, the trolley wire suspension of the present invention comprises, in its simplest embodiment, a messenger wire 1 (FIGS. 1 to 3) which is suspended by means of suspension insulators 2 from brackets 3 (or any other suitable supporting means) mounted on towers 4 and 5. In each span confined between the towers 4 and 5, rigidly secured by one end to the messenger wire 1 are links 6 and 6' made in the form of rigid rods. By the other end, the links 6 and 6' are connected to respective hangers 7 and 7' coupled to a contact element 8. By a contact element is meant that portion of the trolley wire suspension which is in direct contact with the current collector of an electric vehicle (not shown). In order that the contact element 8 be fixed in a horizontal plane with respect to the track (not shown), it is provided with pull-offs 9. The insulators 2 take up mainly mechanical vertical loads both under static and dynamic conditions, while the pull-offs 9 take up chiefly mechanical horizontal loads acting upon the contact element 8 transversally, e.g. wind.

All the principal components of the trolley wire suspension: the messenger wire 1 with the links 6 and 6' secured thereto, the contact element 8 and the hangers 7 and 7' by means of which the contact element is suspended from the messenger wire 1, are interconnected not only mechanically, but also electrically. Therefore, under normal service conditions, all these trolley wire suspension components are live. Hence, both the insulator 2 and the pull-off 9 should properly insulate said live components from the brackets 3 mounted on the towers 4 and 5, thus insulating them from the ground as well.

In the embodiment of a trolley wire suspension under consideration, the contact element consists of only one trolley wire though it may also consist of several trolley wires.

Figure 4:
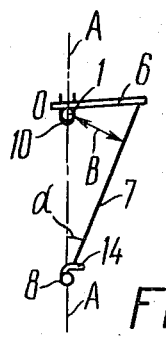
FIG. 4 is a cross section of the trolley wire suspension of FIGS. 1 to 3 through a link made in the form of a rigid rod.

The links 6 and 6' are spaced apart along the length of the messenger wire by a distance that may vary on different portions of the span which depends on how far a respective pair of the links 6 and 6' is from the towers 4 and 5. Besides, each pair of adjacent links 6 and 6' is disposed so that the link 6 is on one side and the link 6' on the other side of the vertical plane passing through the messenger wire. Therewith, under normal conditions, the hangers are arranged at an acute angle $\alpha$ to said plane A—A (FIG. 4), the vertex of this angle being located in the contact element 8 suspended from this hanger.

Such an arrangement of the links 6 and 6' (FIGS. 1 to 3) in such span causes the messenger wire to be twisted on each portion thereof under the action of forces equal to the weight of the contact element of this portion, which forces are applied to said messenger wire portion through the hangers 7 and 7' and links 6 and 6'.

It is evident that in a trolley wire suspension with a rigid coupling of the messenger wire to the insulators of the towers 4 and 5, the links disposed in adjacent spans in direct proximity to each tower may be arranged in the same direction, i.e. on one side of the vertical plane passing through the messenger wire. This arrangement ensures the twisting of the messenger wire on those portions of adjacent spans which are confined between the point of attachment of the messenger wire to the tower and the nearest links.

Figure 2:
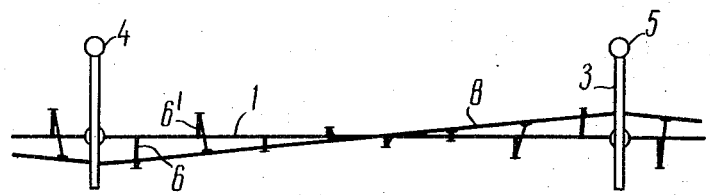
FIG. 2 is a plan view of the trolley wire suspension of FIG. 1.

If, in a trolley wire suspension, the messenger wire is not rigidly coupled to the insulators of the towers 4 and 5, all the adjacent links in each span as well as those in disposed in adjacent spans in direct proximity to the towers must be arranged on either side of the vertical plane passing through the messenger wire as is shown in FIGS. 1 and 2.

Figure 5:
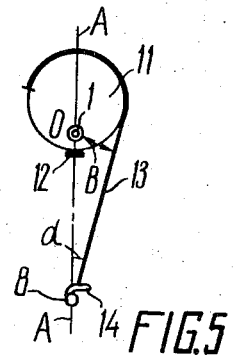
FIG. 5 is a cross section of the trolley wire suspension of FIGS. 1 to 3 through a link made in the form of a rigid cylinder.

In the trolley wire suspension shown in FIGS. 1 to 3, the links 6 and 6' are made in the form of rigid rods (FIG. 4) rigidly secured to the messenger wire 1 by means of clamps 10. However, these links may be made in any other form depending on each particular embodiment of a trolley wire. In some case, it is expedient to make these links 11 in the form of short cylinders (FIGS. 5 and 6). Each such cylinder is placed on the messenger wire 1 so that the latter should pass through the base 11' of the cylinder and be fastened therein by a clamping means such as a clamp bolt 12. The cylinder may be placed in a concentric or eccentric manner relative to the messenger wire 1 (as is shown in FIG. 5) and preferably so that its guide path be parallel to the messenger wire. A hanger 13 is secured to the side surface $11^2$ of the cylinder so as to envelope part of this surface. Therewith, around the circumference of the cylinder or at least along that portion thereof which is enveloped by the hanger, there is provided a groove to receive that portion of the hanger 13 which envelopes the side surface of the cylinder. In this case, as in the case wherein the link is made in the form of a rigid rod, an acute angle $\alpha$ is formed under normal conditions between the hanger 13 and the vertical plane passing through the messenger wire 1, the vertex of this angle being located in the contact element. Shown in FIGS. 5 and 6 are links made in the form of circular cylinders. However, in each particular embodiment, these links may be made in the form of cylinders generated by any cylindrical surface (oval, elliptic, etc). In the embodiments of a trolley wire suspension shown in FIGS. 1 to 4, the contact element 8 consists of only one trolley wire. In this case, the hangers 7 and 7' (FIGS 1 to 4) and 13 (FIG. 5) are connected to the trolley wire of the contact element 8 via an L-shaped link 14. This shape of the link ensures against the occurrence of a moment upsetting the trolley wire. Evidently, there may be used, instead of an L-shaped link, any type of a suspension link selected from those used for connecting hangers to the contact element of the prior art trolley wire suspensions.

In the above embodiment of a trolley wire suspension illustrated in detail in FIGS. 1 to 4, advantage is taken of the resilient properties of the messenger wire. On the one hand, use is made of its elastic resistance inherent in any stretched string, and, on the other hand, use is made of its torsion strength. In this connection, the elasticity of the proposed trolley wire suspension is summarized. As the elasticity of the trolley wire suspension, determined by the elastic resistance of the messenger wire regarded here as a stretched string, decreases from the middle of the span to the tower, provision should be made that the elasticity of that same trolley wire suspension, determined by the torsional strength of the messenger wire, decrease in the reverse direction, i.e. from the tower to the middle of the span. Only on this condition the summarized (total) elasticity of the trolley wire suspension can be maintained equal at any point of the span. In the embodiment under consideration, the required character of variation of the elasticity determined by the torsional strength of the messenger wire, is attained by adjusting the arms OB of the links 6 and 6' (FIGS. 1 to 4) or 11 (FIG. 5) mounted at different points of the span. In so doing, mounted in the middle of the span are links with lesser arms OB, and closer to the towers, the greater the arms OB of the mounted links should be. In some cases, no links may be mounted in the middle of the span at all, the hangers coupled to the contact element over this portion being directly connected to the messenger wire. The required character of variation of elasticity along the span length can be also attained by spacing adjacent links apart by different distances over different portions of the span, lesser distances being maintained in the middle of the span and greater distances being provided near the towers. And, finally, the required character of variation of the elasticity determined by the torsional strength of the messenger wire, along the span length, can be achieved by using links with different arms OB and by spacing the links apart by different distances over different portions of the span.

Respective arms of the links and the separation therebetween are selected according to the length of a span and the cross section of the conductors (messenger wires and trolley wires of the contact element) making up the trolley wire suspension system. The same factors determine the required number of links to be mounted in a span of a particular type of trolley wire suspension.

The following are principal particulars of a trolley wire suspension used in a section of an overhead contact wire system according to the embodiment of the present invention under consideration.

In each span of this overhead contact wire system section, there is provided a steel multiple-strand messenger wire having a cross-section of 95 mm², suspended wherefrom on seven hangers is a contact element consisting of a single copper trolley wire having a cross-section of 100 mm². All in all six links are mounted on the messenger wire in a span 65 m long: two links 300 mm long, two other 250 mm long, and the last two 150 mm long. Six hangers are connected to the free ends of said six links, while the seventh hanger (central) is connected directly to the messenger wire. The longest links (300 mm long) are mounted on the messenger wire each 2.5 m away from the respective tower confining said span. The shortest links (150 mm long) are mounted 10 m away from the central hanger on either side thereof. Each average-size link (250 mm long) is disposed half-way between a longest link (300 mm long) and a shortest link (150 mm long), one in the first half and the other in the second half of the span.

The above trolley wire suspension is installed in the following sequence. First, the messenger wire 1 is suspended on the towers and secured on the insulators 2 mounted on brackets. Then, the contact element 8 is suspended from the messenger wire 1 by means of temporary hangers (usually 3 hangers per span). Next, mounted at predetermined points on the messenger wire are links 6 and 6' which are so fastened that they are all disposed roughly in the vertical plane passing through the messenger wire 1 and their free ends overhang the latter. Finally, by alternately turning the links, one (6) to one side and the other (6') to the opposite side relative to the vertical plane passing through the messenger wire, the contact element 8 is connected to their free ends by means of the hangers 7 and 7'. As a result of all this, the links, acted upon the weight of the contact element, will remain in a new almost horizontal position whereat the force moment appaearing between two links and equal to the weight of a respective portion of the contact element, will be counterbalanced by a moment determined by the torsional strength of the messenger wire over the same portion of the trolley wire suspension under consideration.

This position of the links and, consequently, the angle strain of the messenger wire are determined by the resilience of the latter which in turn depends on the material wherefrom it is made, its cross section, the distance separating the links, as well as the torque applied to the messenger wire, which torque is dependent on the length of the arm OB of the link and the weight of the contact element per hanger.

The above-considered trolley wire suspension shown in FIGS. 1 to 4 operates as follows.

At rest, when no electric vehicle passes under the suspension, it is in a position shown in FIGS. 1 and 2, the total weight of the contact element 8 being taken up by the messenger wire 1. As an electric vehile passed under the suspension in the span between the towers 4 and 5, i.e. when the current collector of the vehicle slides along the contact element 8, the weight of the contact element is partially taken up by the current collector (the electric vehicle and its current collector are not shown in the drawing). As a result, the response of the hangers 7 and 7' being less active, the links 6 and 6' turn to some extent and their ends connected to the hangers go up assuming another position whereat the force moments acting upon the links from the contact element at the moment the latted makes contact with the current collector and form the messenger wire, are balanced. A respective portion of the contact element is, therewith, also lifted to some extent.

The messenger wire of the trolley wire suspension, consisting of a plurality of intertwined steel or copper strands, cannot be ideally resilient. Therefore, the dependence of the force twisting such a wire of the angle strain is graphically represented as a closed curve (loop) which is sometimes termed as the "mechanical hysteresis loop." The area of this loop is proportional to the energy consumed per cycle, which cycle comprises the twisting of the messenger wire under the action of external forces and untwisting under the action of elastic forces. This phenomenon is responsible for an increase in the inelastic resistance forces (damping) of the proposed trolley wire suspension as compared to those of the prior art suspensions wherein the messenger wire is not subject to torsion. Such an increase in the inelastic resistance forces (damping) is conducive to a substantial decrease in the amplitude of self-induced vibrations of the trolley wire suspension whenever such may occur, and improves the current collection by several current collectors of high-speed electric vehicles at a time.

Figure 7:
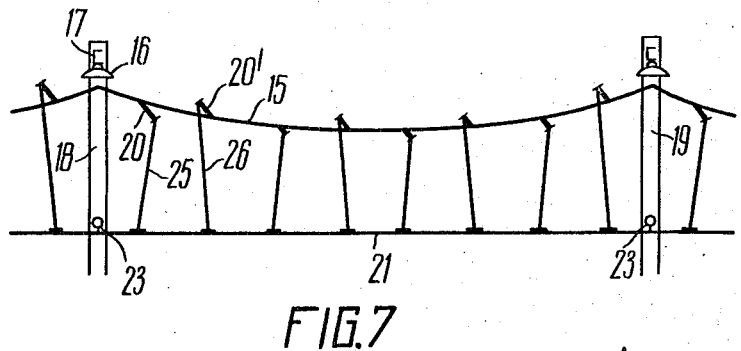
FIG. 7 is a simplified side elevation of a trolley wire suspension with one messenger wire and a contact element consisting of two trolley wires, according to the invention.
Figure 8:
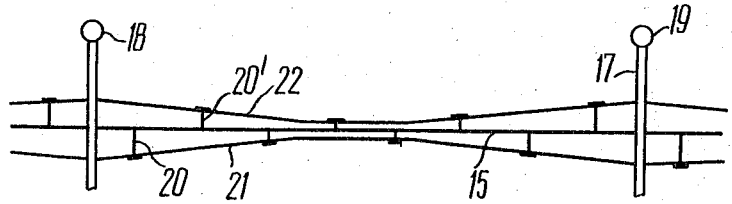
FIG. 8 is a plan view of the trolley wire suspension of FIG. 7.

Shown in FIGS. 7 to 9 is another embodiment of a trolley wire suspension according to the present invention. This trolley wire suspension comprises a messenger wire 15 suspended from suspension insulators 16 fixed to brackets 17 mounted on towers 18 and 19. In each span confined between the towers 18 and 19, rigidly secured to the messenger wire 15 are links 20 and 20' made in the form of rigid rods. Besides, the trolley wire suspension is provided with a contact element consisting of two trolley wires 21 and 22. These trolley wires are arranged in a horizontal plane symmetrically with respect to the track axis, converging in the middle of a span and diverging near towers. such a mutual arrangement of the trolley wires is ensured by means of pull-offs 23 and 24 provided near each tower. In this embodiment of a trolley wire suspension, the trolley wire 21 is connected through hangers 25 to the free ends of the links 20, while the trolley wire 22 in connected through hangers 26 to the links 20'. Such a connection of the trolley wires of the contact element ensures an almost vertical position of each hanger is a plane normal to the trolley wire suspension. In this embodiment, use may be made of links in the form of rigid rods, rigid short cylinders or in any other form as is the case with the first embodiment considered earlier.

Such trolley wire suspensions with a contact element consisting of two trolley wires feature better stability against winds which makes them especially advantageous for use in areas noted for strong winds.

The trolley wire suspension having a contact element consisting of two trolley wires operates in a manner similar to that of the first embodiment of trolley wire suspension with only one trolley wire. At rest, when no electric vehicle passes under the suspension, the total weight of both trolley wires 21 and 22 is taken up by the messenger wire 15. As an electric vehicle passes under the suspension, i.e. when the current collector of an electric vehicle slides along the trolley wires 21 and 22, the weight of these trolley wires is partially taken up by the current collector (the electric vehicle and its current collector are not shown in the diagram). As a result, the response of the hangers 25 and 26 being less active, the links 20 and 20' turn to some extent and their ends connected to the hangers go up, the links 20 and 20' assuming a position whereat the balance of moments is restored.

Both trolley wires being arranged in a horizontal plane and fixed in a manner described hereinabove, this particular trolley wire suspension offers significant resistance to forces acting horizontally thereon. This accounts for a better stability of this trolley wire suspension even against high-velocity winds.

Figure 10:
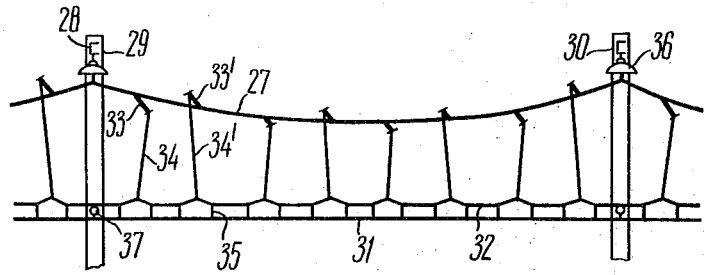
FIG. 10 is a simplified side elevation of a trolley wire suspension with a messenger wire, a supplementary wire, and a contact element suspended directly from the latter and consisting of one trolley wire, according to the invention.
Figure 11:
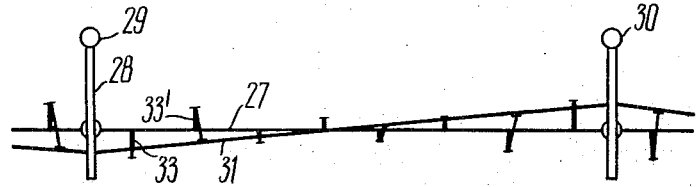
FIG. 11 is a plan view of the trolley wire suspension of FIG. 10.

Consider now still another embodiment of a trolley wire suspension according to the present invention. This trolley wire suspension comprises a messenger wire 27 (FIGS. 10 to 12) suspended from brackets 28 mounted on towers 29 and 30, a contact element 31 consisting of one trolley wire, a supplementary wire 32, links 33 and 33', hangers 34 and 34', and supplementary hangers 35. Suspension insulators 36 provide for the insulation of the trolley wire suspension, which is live under normal conditions, from the brackets 28 and, consequently, from the ground. The supplementary hangers 35 serve to connect the contact element 31 to the supplementary wire 32. The links 33 and 33' are made in the form of rigid rods and are rigidly secured, by one end, to the messenger wire 27, while by the other end they are coupled to the hangers whose lower ends are in turn connected to the supplementary wire 32. The contact element is fixed relative to the track (not shown) by means of pull-offs 37. The links 33 and 33' are separated along the length of the messenger wire by a distance varying over different portions of a span (less in the middle of the span and greater near the towers). Besides, each pair of the adjacent links 33 and 33' is so arranged that the link 33 is disposed on one side and the link 33' on the other side of the vertical plane passing through the messenger wire. In this embodiment, the links 33 and 33' disposed in adjacent spans in direct proximity to the towers 29 and 30 are also arranged on either side of said vertical plane, but in case the messenger wire is rigidly fixed in the insulators 36, the links 33 and 33' disposed in adjacent spans in direct proximity to the towers 29 and 30 may be arranged on one side of the vertical plane passing through the messenger wire 27. Such trolley wire suspensions with a supplementary wire characterized by equal elasticity at every point of a span should be perferably used on express tracks.

The operation of this type of trolley wire suspensions is as follows.

At rest, when no electric vehicle passes under the trolley wire suspension, the total weight of the contact element 31 plus that of the supplementary wire 32 are taken up the messenger wire 27. As an electric vehicle passes under the trolley wire suspension, i.e. when the current collector of the electric vehicle slides along the contact element 31, the weight of the contact element 31 is partially taken up by the current collector (the electric vehicle and its current collector are not shown in the drawing). As a result, the response of the hangers 34 and 34' being less active, the links 33 and 33' turn to some extent and their ends connected to the hangers go up, the links 33 and 33' assuming a position whereat the balance of moments is restored.

As is seen from the consideration of the above embodiments of trolley wire suspensions for use in overhead contact wire systems of electric transport, the present invention is easily applicable to all types of most generally employed catenary suspensions in modern electric transport in areas with diverse climatic conditions.

Test results indicate that in all the above-conidered embodiments of trolley wire suspensions there has been attained equal elasticity at every point of a span. The proposed trolley wire suspension is simple in design, especially in the first embodiment thereof in which it comprises one messenger wire and a contact element consisting of only one trolley wire, hence it is inexpensive. The installation and adjustment of such suspensions are easy and expeditious. These trolley wire suspensions are reliable in operation and easy in maintenance.

Test results also inducate that under sharply varying loads the proposed trolley wire suspensions remain unaffected by self-induced vibrations, and artificially induced low-frequency high-amplitude oscillations were damped in no time without casing any material damage. These trolley wire suspensions show good performance in current experimental service on railroads with high-speed electric vehicles and in areas with arduous climatic conditions.

What is claimed is:

1. A trolley wire suspension for use in an overhead contact wire system of electric transport comprising, in each span of said overhead contact wire system, a contact element; said contact element ensuring direct electric contact between said overhead contact wire system and the current collector of an electric vehicle and consisting of at least one trolley wire; a messenger wire; said messenger wire being connected to said contact element; hangers, said hangers linking said messenger wire with said contact element; at least two links; each of said links being rigidly secured by one of its ends to said messenger wire and connected by the other end to one of said hangers coupled to said contact element; said links being spaced apart along the length of said messenger wire and alternately disposed on either side of the vertical plane passing through said messenger wire, thus enabling the latter to be twisted.

2. A trolley wire suspension for use in an overhead contact wire system of electric transport as claimed in claim 1, wherein said contact element comprises two trolley wires arranged in the horizontal plane on either side of the vertical plane passing through said messenger wire and wherein said links, secured to said messenger wire and alternately disposed on either side of the vertical plane passing through said messenger wire, are connected to said hangers which are coupled to the contact element so that each link on one side of the vertical plane passing through said messenger wire is connected to the hanger, coupled to the trolley wire of said contact element, which is disposed on the same side of the vertical plane.

3. A trolley wire suspension for use in an overhead contact wire system of electric transport as claimed in claim 1, wherein said messenger wire is rigidly secured in proximity to a tower and wherein the first link fixed on said messenger wire in the span before said tower, and the last link fixed on said messenger wire in the span behind said tower, the latter span being adjacent to the former, are disposed on one side of the vertical plane passing through said messenger wire.

4. A trolley wire suspension for use in an overhead contact wire system of electric transport as claimed in claim 2, wherein said messenger wire is rigidly secured in proximity to a tower and wherein the first link fixed on said messenger wire in the span before said tower, and the last link fixed on said messenger wire in the span behind said tower, the latter span being adjacent to the former, are disposed on one side of the vertical plane passing through said messenger wire.

5. A trolley wire suspension for use in an overhead contact wire system of electric transport as claimed in claim 1, wherein each of said links is made in the form of a rigid rod.

6. A trolley wire suspension for use in an overhead contact wire system of electric transport as claimed in claim 2, wherein each of said links is made in the form of a rigid rod.

7. A trolley wire suspension for use in an overhead contact wire system of electric transport as claimed in claim 3, wherein each of said links is made in the form of a rigid rod.

8. A trolley wire suspension for use in an overhead contact wire system of electric transport as claimed in claim 4, wherein each of said links is made in the form of a rigid rod.

9. A trolley wire suspension for use in an overhead contact wire system of electric transport as claimed in claim 1, wherein each of said links is made in the form of a rigid cylinder disposed on said messenger wire passing through the base of said cylinder and wherein said one of said hangers coupled to said contact element is connected to the side surface of said cylinder.

10. A trolley wire suspension for use in an overhead contact wire system of electric transport as claimed in claim 2, wherein each of said links is made in the form of a rigid cylinder disposed on said messenger wire passing through the base of said cylinder and wherein said one of said hangers coupled to said contact element is connected to the side surface of said cylinder.

11. A trolley wire suspension for use in an overhead contact wire system of electric transport as claimed in claim 3, wherein each of said links is made in the form of a rigid cylinder disposed on said messenger wire passing through the base of said cylinder and wherein said one of said hangers coupled to said contact element is connected to the side surface of said cylinder.

12. A trolley wire suspension for use in an overhead contact wire system of electric transport as claimed in claim 4, wherein each of said links is made in the form of a rigid cylinder disposed on said messenger wire passing through the base of said cylinder and wherein said one of said hangers coupled to said contact element is connected to the side surface of said cylinder.

13. A trolley wire suspension for use in an overhead contact wire system of electric transport as claimed in claim 1, wherein said contact element is connected to said messenger wire through a supplementary L-shaped link provided on each of said hangers, said L-shaped link being rigidly secured by one of its ends to said contact element and directly connected by the other end to the lower free end of the hanger, thus precluding a force moment upsetting said contact element.

14. A trolley wire suspension for use in an overhead contact wire system of electric transport as claimed in claim 3, wherein said contact element is connected to said messenger wire through a supplementary L-shaped link provided on each of said hangers said L-shaped link being rigidly secured by one of its ends to said contact element and directly connected by the other end to the lower free end of the hanger, thus precluding a force moment upsetting the contact element.

15. A trolley wire suspension for use in an overhead contact wire system of electric transport as claimed in claim 5, wherein said contact element is connected to said messenger wire through a supplementary L-shaped link provided on each of said hangers, said L-shaped link being rigidly secured by one of its ends to said contact element and directly connected by the other end to the lower free end of the hanger, thus precluding a force moment upsetting the contact element.

16. A trolley wire suspension for use in an overhead contact wire system of electric transport as claimed in claim 9, wherein said contact element is connected to said messenger wire through a supplementary L-shaped link provided on each of said hangers, said L-shaped link being rigidly secured by one of its ends to said contact element and directly connected by the other end to the lower free end of the hanger, thus precluding a force moment upsetting the contact element.

17. A trolley wire suspension for use in an overhead contact wire system of electric transport as claimed in claim 1, wherein said contact element is connected to said messenger wire along each of said hangers through a supplementary wire suspended therefrom is said contact element and rigidly secured thereto are the free ends of all said hangers.

18. A trolley wire suspension for use in an overhead contact wire system of electric transport as claimed in claim 3, wherein said contact element is connected to said messenger wire along each of said hangers through a supplementary wire suspended therefrom is said contact element and rigidly secured thereto are the free ends of all said hangers.

19. A trolley wire suspension for use in an overhead contact wire system of electric transport as claimed in claim 5, wherein said contact element is connected to said messenger wire along each of said hangers through a supplementary wire suspended therefrom is said contact element and rigidly secured thereto are the free ends of all said hangers.

20. A trolley wire suspension for use in an overhead contact wire system of electric transport as claimed in claim 9, wherein said contact element is connected to said messenger wire along each of said hangers through a supplementary wire suspended therefrom is said contact element and rigidly secured thereto are the free ends of all said hangers.

* * * * *